United States Patent
Chung et al.

(10) Patent No.: US 7,580,410 B2
(45) Date of Patent: Aug. 25, 2009

(54) EXTENSIBLE PROTOCOL PROCESSING SYSTEM

(75) Inventors: Shen-Ming Chung, Hsinchu (TW);
Yun-Yen Chen, Hsinchu (TW);
Yau-Cheng Tsai, Hsinchu (TW);
Kuo-Hwa Pu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 520 days.

(21) Appl. No.: 11/519,846

(22) Filed: Sep. 13, 2006

(65) Prior Publication Data

US 2007/0140297 A1    Jun. 21, 2007

(30) Foreign Application Priority Data

Dec. 16, 2005 (TW) ............... 94144937 A

(51) Int. Cl.
*H04L 12/56* (2006.01)
(52) U.S. Cl. .................. 370/392; 370/474; 370/475; 709/250
(58) Field of Classification Search .......... 370/389, 370/392, 474, 475; 709/238–242, 250
See application file for complete search history.

(56) References Cited

U.S. PATENT DOCUMENTS

| | | | |
|---|---|---|---|
| 6,434,620 B1 | 8/2002 | Boucher et al. | |
| 6,591,302 B2 | 7/2003 | Boucher et al. | |
| 2004/0062245 A1 | 4/2004 | Sharp et al. | |
| 2004/0064590 A1* | 4/2004 | Starr et al. | ............... 709/250 |
| 2004/0243723 A1 | 12/2004 | Davis et al. | |

FOREIGN PATENT DOCUMENTS

| | | |
|---|---|---|
| TW | 200500864 | 1/2005 |
| TW | 200525966 | 8/2005 |
| WO | WO20040211507 | 3/2004 |

* cited by examiner

*Primary Examiner*—Pao Sinkantarakom
(74) *Attorney, Agent, or Firm*—Volentine & Whitt, PLLC

(57) ABSTRACT

The present invention relates to an extensible protocol processing system. The system of the invention is mounted between a host and a network, and is utilized to offload partial network protocol packets of the host. The protocol processing system comprises a microprocessor, a host interface device, a medium access controller, a message interface controller, a receiving device and a transmitting device. The system of the invention can provides better efficiency of the host for processing the offloaded partial network protocol packets. Besides, the function of the system of the invention can be extended by increasing the message and modifying the software or the firmware. Therefore, the system of the invention can be utilized to various applications, and has the easily extensible effects.

16 Claims, 15 Drawing Sheets

EXTENSIBLE PROTOCOL PROCESSING SYSTEM

BACKGROUND OF THE INVENTION

1. Field of the Invention

The invention relates to a protocol processing system, particularly to an extensible protocol processing system.

2. Description of the Related Art

Conventionally, by enlarging the capacity of the buffer of the network interface controller, the transmission rate and/or the size of maximum transmission unit (MTU) or the combinations, network speed can be easily boosted. However, as the transmission rate of the Ethernet network is continuously increased and, presently, over 1 Gbps, a network interface controller with more acceleration functions of protocol processing is required. For the transmission rate over 10 Gbps, without the acceleration function of protocol processing, the bandwidth utilization rate of the network decays because the software is not capable of processing the huge amount of network packets per unit time, and the worse, the software cannot even focus on its original assigned tasks, for example, as a file server.

Among many network protocols, TCP/IP is the most popular protocol used for network applications. For example, the TCP/IP is used in Web service, audio and video service, storage service and remote service. In the present, the above-mentioned services are processed by personal computer or server, and most of executing procedures are processed by software, for example the packet encapsulating and decapsulating. In consumer electronics and digital electronic equipments, using these services is a trend. This trend results in needs for some acceleration functions which directly packaged in a single IC in the bandwidth under 1 Gbps. However, in order to get useful for more applications, such acceleration functions, which get used to be called Protocol Processing Engine and usually be implemented as intellectual properties, must be designed with extensibilities.

The applications of the above-mentioned intellectual property includes Storage Area Network (SAN), Network Attached Storage (NAS) devices, Web server, file server, remote boot, VoIP and any other applications which need to connection to moderate high speed network but, at the same time, do not want to spend too much processing time in the corresponding network protocol handling. Above all, in networks of 10 Gbps bandwidth, such an intellectual property is considered as a must despite of any assumptions. These reasons make the application range of such an intellectual property so wide.

Referring to the U.S. Pat. No. 6,434,620, it shows a structure of a protocol processing engine. The protocol processing engine is a recursive processing procedure. In the recursive processing procedure, the packet of each network layer comprises a header and a payload. Referring to the U.S. Pat. No. 2004/0243723 A1, filed by Intel Corporation, it shows a processor of high performance, the processing procedure of the protocol processing engine and the management of the socket in the operation system.

Referring to the U.S. Pat. No. 6,591,302, it shows a fast-path apparatus for receiving data corresponding to a TCP connection. The apparatus assembles a header required for each protocol processing layer from a protocol stack, combines the header and an appropriate size of data and sends the combination to the next network layer. Referring to FIG. 5A, it shows transmission process in U.S. Pat. No. 6,591,302. A session sequencer sends the data to a transport sequencer via a multiplexer. The transport sequencer adds H1 headers in a packet buffer of divided transport segments to form transport packets. The transport packets are delivered to a network sequencer via the multiplexer, and the Ethernet packets are delivered to the next network layer repetitively.

Referring to FIG. 5B, it shows the receiving process in the U.S. Pat. No. 6,591,302. The protocol processing in each layer extracts the headers from the packets received and compares them with connection data stored in the protocol stack to find a connection relation with the preceding layer, and the remaining payload data of this transmission is combined and sent to an upper layer of the protocol processing. A packet control sequencer confirms that the Ethernet packets are received from the MAC sequencer, and a multiplexer sends the packets received to a network sequencer to remove their H3 headers and combines the remainder and payload packets in a same network layer for further unpacking.

An RISC microprocessor with a protocol offload engine disclosed in U.S. Pat. No. 6,591,302 can speed up protocol offload performance but cannot easily obtain heavy complicated protocol errors and associated error recovery, which leads to a disadvantage of firmware cost increase. The errors occupy a slight part of the entire packets, but deeply affects the CPU load when certain errors not necessarily interrupting the host CPU cannot be filtered effectively.

An SRAM disclosed in U.S. Pat. No. 6,591,302 is responsible to offload operation and performance. Any packet or data not able to offload immediately is moved from the SRAM to an DRAM having greater room and lower cost in order to wait until all other packets or information is arrived. Next, all information arrived is moved from the DRAM to the SRAM for offload performance. As such, it can simplify the offload engine design and the complexity of internal data path. However, data moved between the SRAM and the DRAM can relatively consume the bandwidth of internal circuits. In addition, the SRAM may lead to a bandwidth bottleneck. For a network bandwidth of 1 Gbps, a full duplex protocol offload engine needs a bandwidth of 2 Gbps, but a high-speed dual-port SRAM is expensive.

Consequently, there is an existing need for a protocol processing system to solve the above-mentioned problem.

SUMMARY OF THE INVENTION

The present invention provides an extensible protocol processing system. The system of the invention is mounted between a host and a network, and is utilized to offload the packet processing of some designate network protocols from the host. The protocol processing system comprises a microprocessor, a host interface device, a medium access controller, a message interface controller, a receiving device and a transmitting device. The microprocessor is used for offloading the packet processing of designate network protocols from the host. The host interface device is used for connecting to the host to exchange the packets, payloads and control messages. The medium access controller is used for connecting to the network. The message interface controller is used for receiving message and providing interface for the microprocessor to access the received message, and for receiving messages from the microprocessor, and forwards each the message to an assigned device. The receiving device is used for temporarily storing the packets received by the medium access controller and examining the validity of the packets. The receiving device extracts at least part of header information from each received packet to form a receiving message and transmits the message to the message interface controller.

The transmitting device is used for transmitting one of two kinds of the packets to the network medium access controller.

A first kind of packet is transmitted directly from the host to the transmitting device via the host interface device, and a second kind of packet is combined by header information and a corresponding payload, wherein the header information comprises a transmitting message.

The system of the invention can provides better efficiency of the host for processing the offloaded partial network protocol packets. Besides, the system of the invention utilizes message to communicate the above device, and thus the function of the system of the invention can be extended by increasing the message and modifying the software or the firmware. Therefore, the integrated circuit chip including the system of the invention can be utilized to various applications, and has the easily extensible effects.

DETAILED DESCRIPTION OF THE INVENTION

Figure 1:
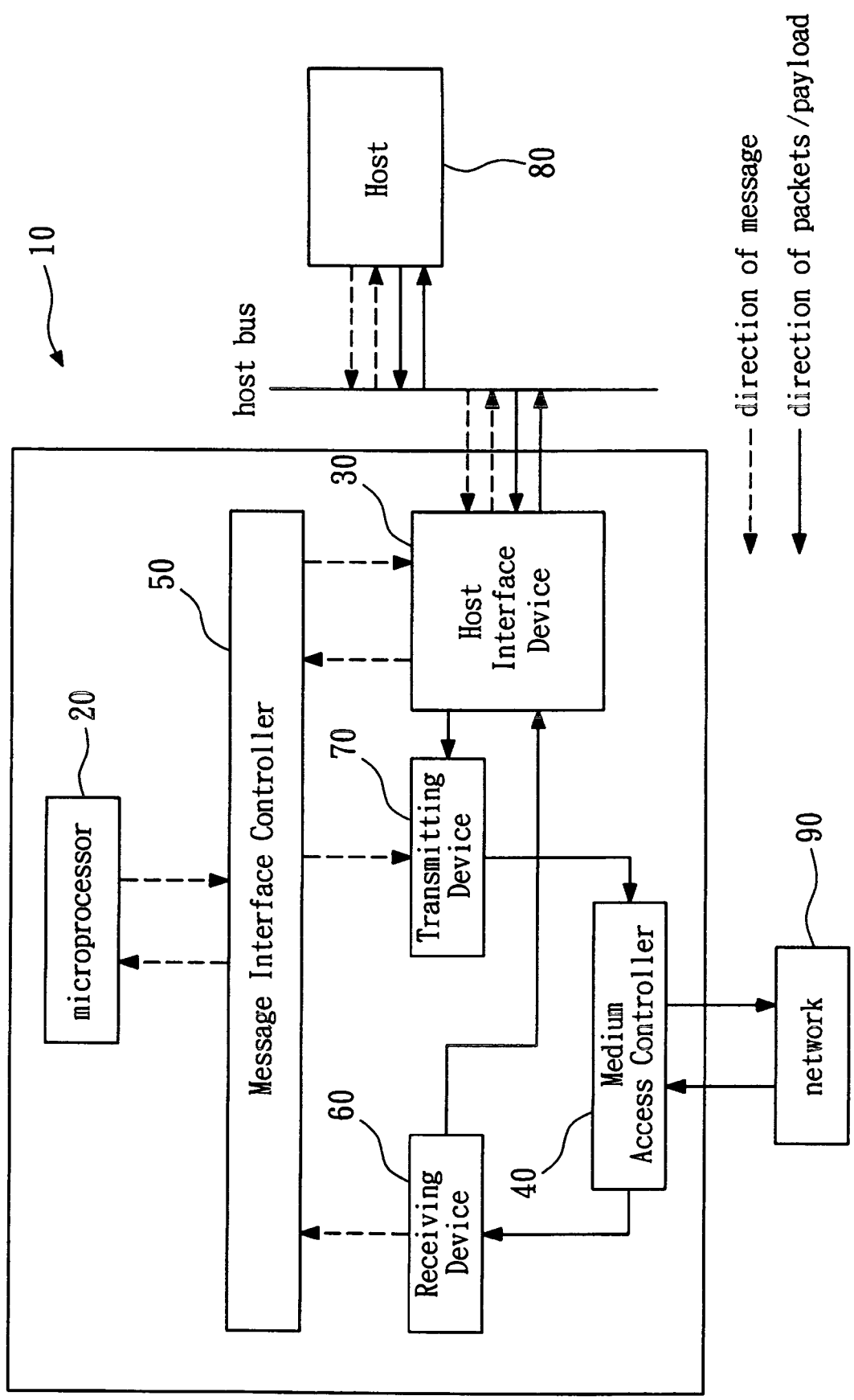
FIG. 1 shows an extensible protocol processing system of the present invention.

Referring to FIG. 1, it shows an extensible protocol processing system of the present invention. According to the invention, the extensible protocol processing system 10 of the invention is mounted between a host 80 and a network 90, and is utilized to offload packet processing of some designate network protocols from the host 80, for example the TCP/IP. The protocol processing system 10 comprises a microprocessor 20, a host interface device 30, a medium access controller 40, a message interface controller 50, a receiving device 60 and a transmitting device 70. The microprocessor 20 is used to offload packet processing of the designate network protocol from the host 80. The offloadable packets are processed directly by the microprocessor 20, and only the payload is exchanged with the host 80 to release the working loading from the host 80 so as to improve the efficiency of the host 80. Note that, offloaded packet and offloadable packet depicted in the specification and claims are all referred to the packet which is processed by the microprocessor 20. Hence un-offloaded packet and un-offloadable packet are all referred to the packet which is not processed by the microprocessor 20.

For un-offloadable packets, the extensible protocol processing system 10 works as a common network interface device, such as a network interface card (NIC). For packet reception, after receiving an un-offloadable packet, the microprocessor 20 transmits a control message to the host interface device 30 through the message interface controller 50. Then the host interface device 30 retrieves the packet addressed by the control message and transmits it to the host 80 without any modifying. For packet transmission, the un-offloadable packets are firstly transmitted to the transmitting device 70 through the host interface device 30 and then the packet are transmitted, without any modifying, to the medium access controller 40 by the transmitting device 70.

The host interface device 30 is used to connect to the host 80 and is used to exchange the packets, the payloads and the control messages.

The medium access controller 40 connects to the network terminal 90 and is used to receive the packets from the network 90 and to transmit the packets to the network 90.

A message comprises a message header and a message content. The message header at least comprises 3 fields including message type, message sub-type and message length, while the message content should be interpreted according to the message sub-type in the message header by corresponding device. The source or the destination of the message is recorded in the message type and is interpreted from the viewpoint of the microprocessor 20. For example, the message type of the message from the receiving device 60 to the microprocessor 20 is recorded as "receiving device", which means the message source is the receiving device 60. As another example, the message transmitted from the microprocessor 20 to the transmitting device 70 gets its message type as "transmitting device", which means the message destination is the transmitting device 70. The format of the message content for different message can be different. Message recipient analyzes the message content according to the message sub-type. The message length indicates the total length of the message.

The message interface controller 50 is used for receiving message from the host interface device 30 and the receiving device 60, and providing an interface for the microprocessor 20 to access the received message. Besides, the message interface controller 50 receives message from the microprocessor 20 and forwards the message to an assigned device according to the message type in the message header, for example, "transmitting device" 70 or "host interface device" 30.

The receiving device 60 is used to temporarily store the packets received by the medium access controller 40 and to examine the validity of the packets. Each received packet is assigned with a buffer index which indicates in where the packet is stored. If the packet is recognized to be offloadable, the receiving device integrates the header part of a valid packet with a buffer index and hash key(s) to form a receiving message and transmits the message to the message interface controller 50. If a received packet is un-offloadable, only the buffer index is formed as a receiving message and transmitted to the message interface controller 50. In the TCP/IP embodiment, there is only one hash key and the hash key is calculated by a certain function of the socket pair, i.e. the source IP address, the destination IP address, the source TCP port and the destination TCP port.

The transmitting device 70 is used for transmitting one of two kinds of the packets to the medium access controller 40. The packets to be transmitted are formed by two ways. As one of the two ways, the host 80 can directly give packets to the transmitting device via the host interface device 30 and the transmitting device 70 sends them out without any modifying. As another way, the transmitting device 70 firstly received a message called transmitting message from the microprocessor 20 and then integrates the header information contained in the transmitting message and a corresponding payload into a packet. The corresponding payload is obtained through the host interface device 30, from the host 80.

Figure 2:
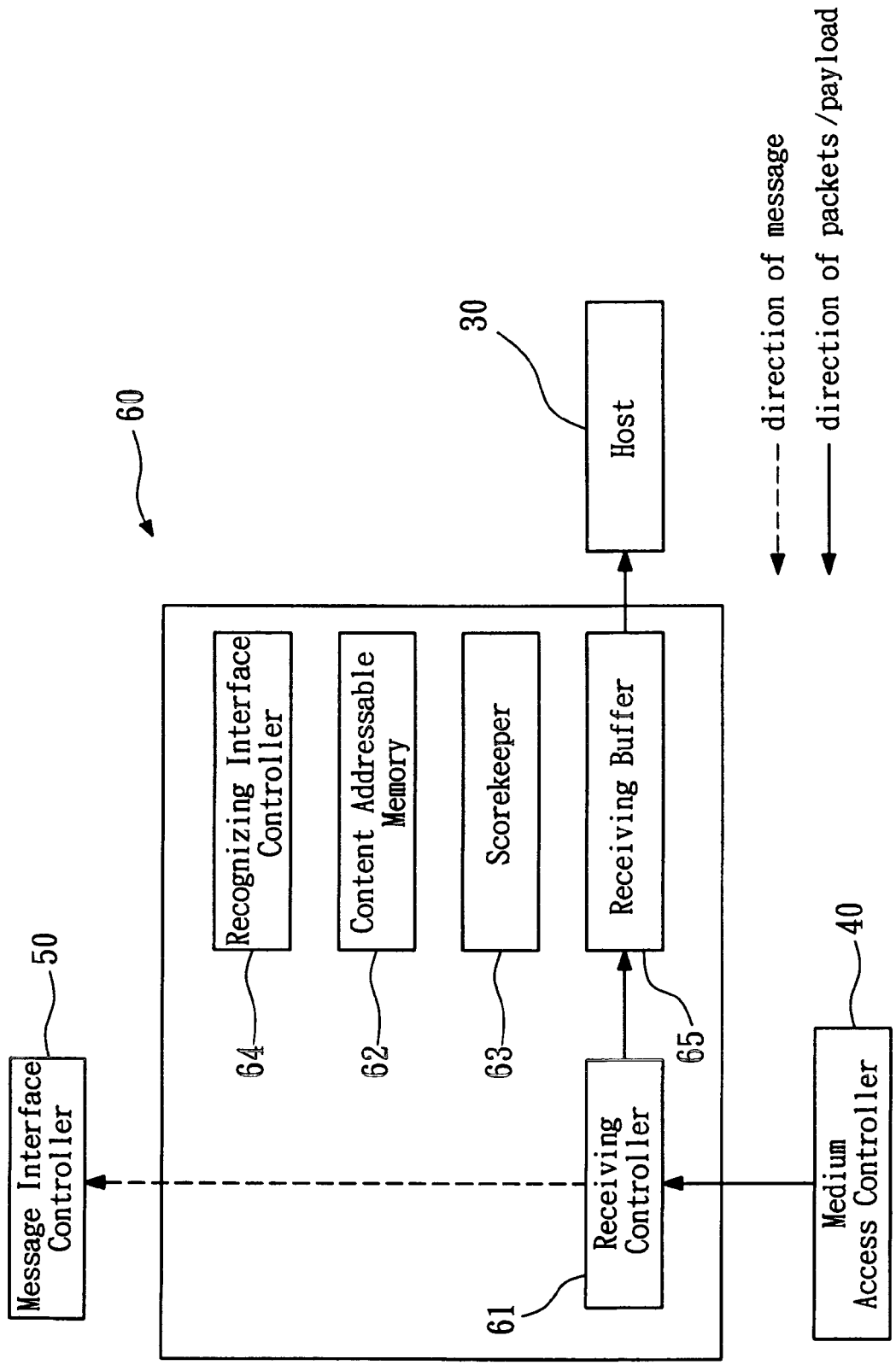
FIG. 2 shows a receiving device of the present invention.

Referring to FIG. 2, it shows the receiving device of the present invention. The receiving device 60 comprises a receiving controller 61, a content addressable memory 62, a scorekeeper 63, a recognizing interface controller 64 and a receiving buffer 65. Upon receiving packet, the receiving controller 61 decides the temporary store address, examines the validity of the packets, recognizes the type of the packets, generates a receiving message and transmit the receiving message to the message interface controller 50

The receiving controller 61 of the receiving device 60 classifies each examined valid packet into three types according a recognizing step, and the type, or called packet type, is added to the receiving message. The three types of packet comprise "fast-path", "slow-path" and "non-recognized". The "fast-path" indicates that the microprocessor 20 is responsible to process the received packet, i.e. the packet is offloadable. The "slow-path" indicates that the host 80 is responsible to process the received packet, i.e. the packet is un-offloadable. The "non-recognized" indicates that the receiving device 60 cannot recognize the packets and the recognizing step is postponed and performed by the microprocessor 20.

The content addressable memory 62 is used to store a plurality of recognizing information of the offloadable protocol connections. In the embodiment of the TCP/IP, the recognizing information is the socket pair which comprises four header fields, that are source IP address, destination IP address, source TCP port and destination TCP port. By comparing the recognizing information of the offloadable protocol connections in the content addressable memory 62 with a received packet, the receiving controller 61 recognizes whether the received packet belongs to one of the offloadable protocol connections. If the received packet belongs to one of the offloadable protocol connections, the packet is called offloadable and the packet type "fast-path" is recorded in the corresponding receiving message. Whatever a packet whose corresponding receiving message contains the packet type as "fast-path" will be processed directly by the microprocessor 20 and only its payload is exchanged with the host 80.

The scorekeeper 63 is used to calculate a usage status of the recognizing information stored in the content addressable memory 62. The recognizing interface controller 64 is used to provide an interface for the microprocessor 20 to read said usage status calculated by the scorekeeper 63. According to the usage status, the microprocessor 20 can add/remove the recognizing information into/from the content addressable memory 62 by utilizing the interface provided by the recognizing interface controller 64.

The receiving buffer 65 is used to store the valid packets examined by the receiving controller 61. For a valid packet which is recognized as offloadable, receiving device 60 generates a receiving message and transmits the message to the message interface controller 50. The receiving message at least comprises partial header information of the packet, the packet type and the buffer index which indicates where a received packet is temporary stored in the receiving buffer 65.

Figure 3:
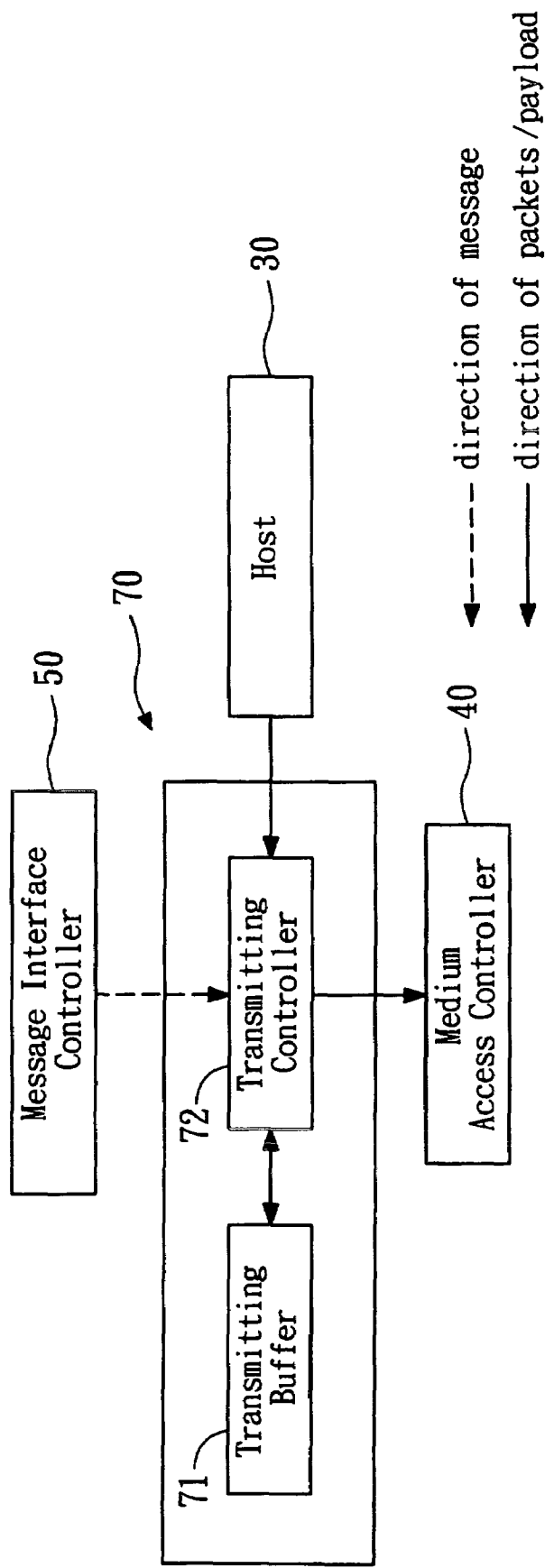
FIG. 3 shows a transmitting device of the present invention.

Referring to FIG. 3, it shows the transmitting device of the present invention. The transmitting device 70 comprises a transmitting buffer 71 and a transmitting controller 72. The transmitting buffer 71 is used to temporarily store the packets that are going to be transmitted to the media access controller 40. For packets which are un-offloadable, the Host 80 can directly transfer the packets to the transmitting buffer 71 in the transmitting device via the host interface device 30 and the transmitting device 70 sends them out without any modifying. Otherwise, for packets which are offloadable, the transmitting controller 72 firstly received a message called transmitting message from the microprocessor 20. The transmitting message at least comprises partial header information of the packet, payload address of the host 80 and payload length. The transmitting controller 72 then constructs a packet header from the partial header information and stores said packet header in the transmitting buffer 71. According to the payload address of host 80 and the payload length, a payload is copied into the transmitting buffer 71 from the host 80 through the host interface controller 30. The copied payload is combined with the constructed packet header in the transmitting buffer 71 to form an offloadable packet, and the offloaded packet is then transmitted to the medium access controller 40.

Figure 4:
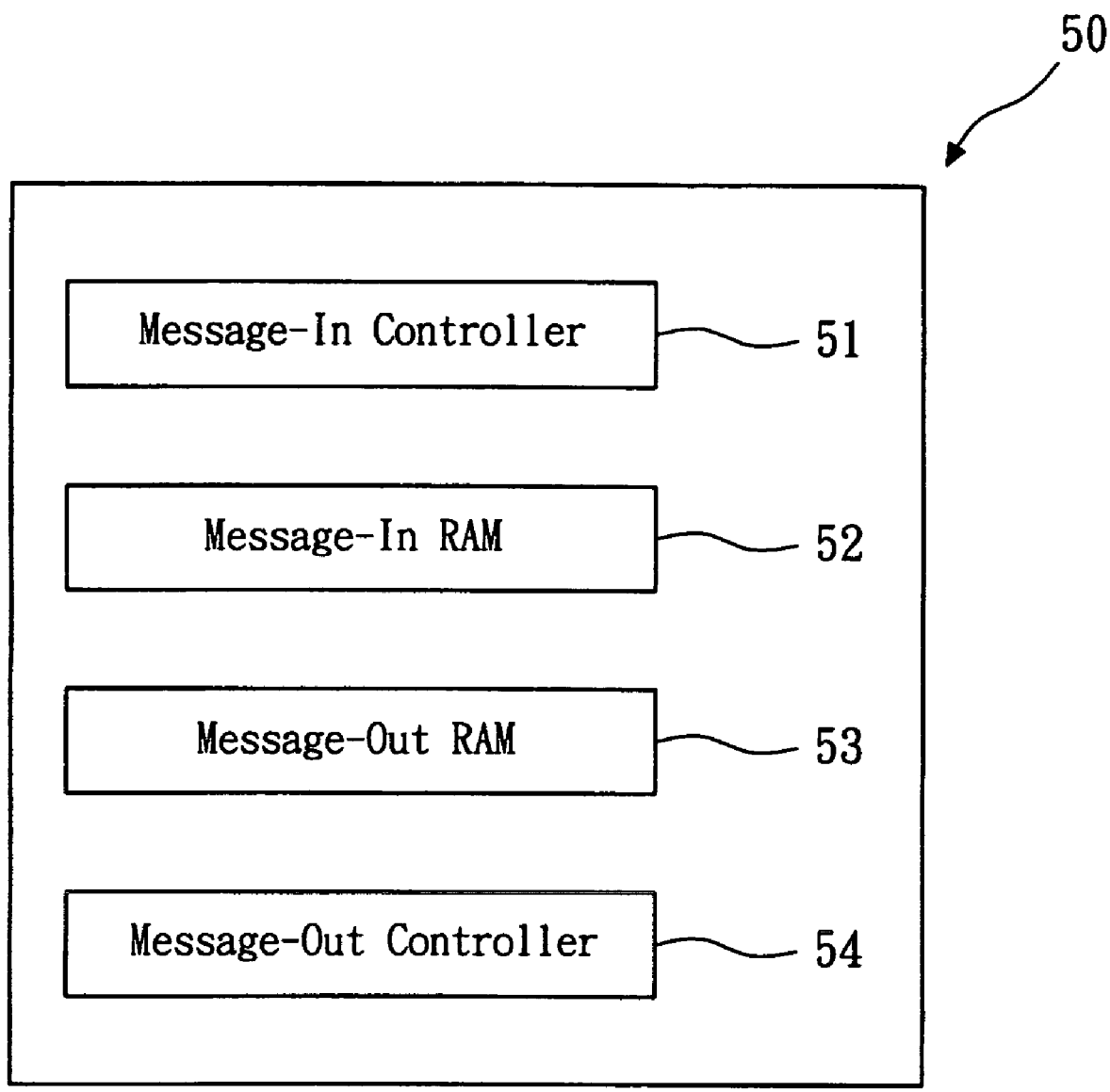
FIG. 4 shows a message interface controller of the present invention.
Figure 5A:
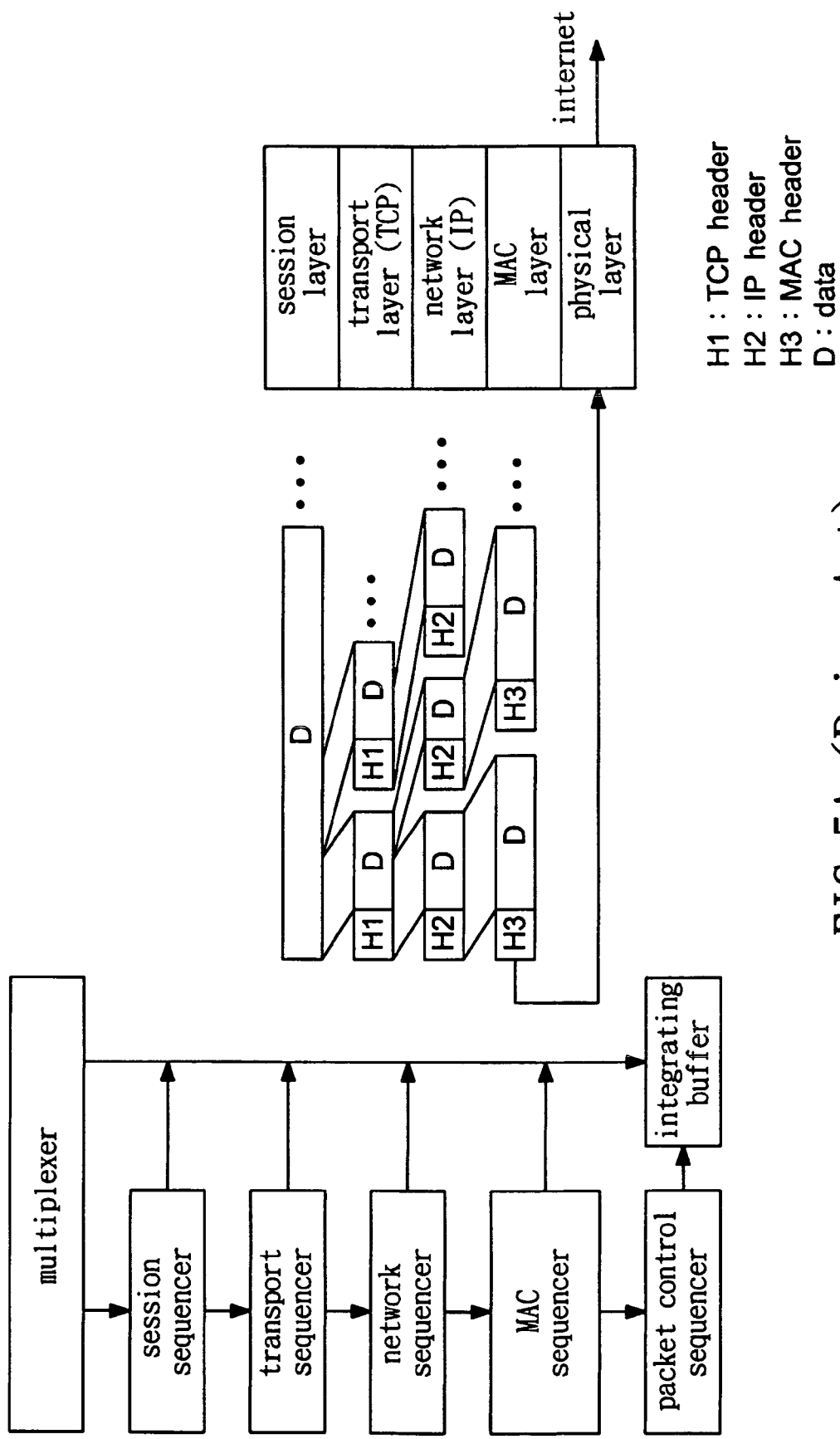
FIG. 5A shows the process for transmitting packets of the prior art.
Figure 5B:
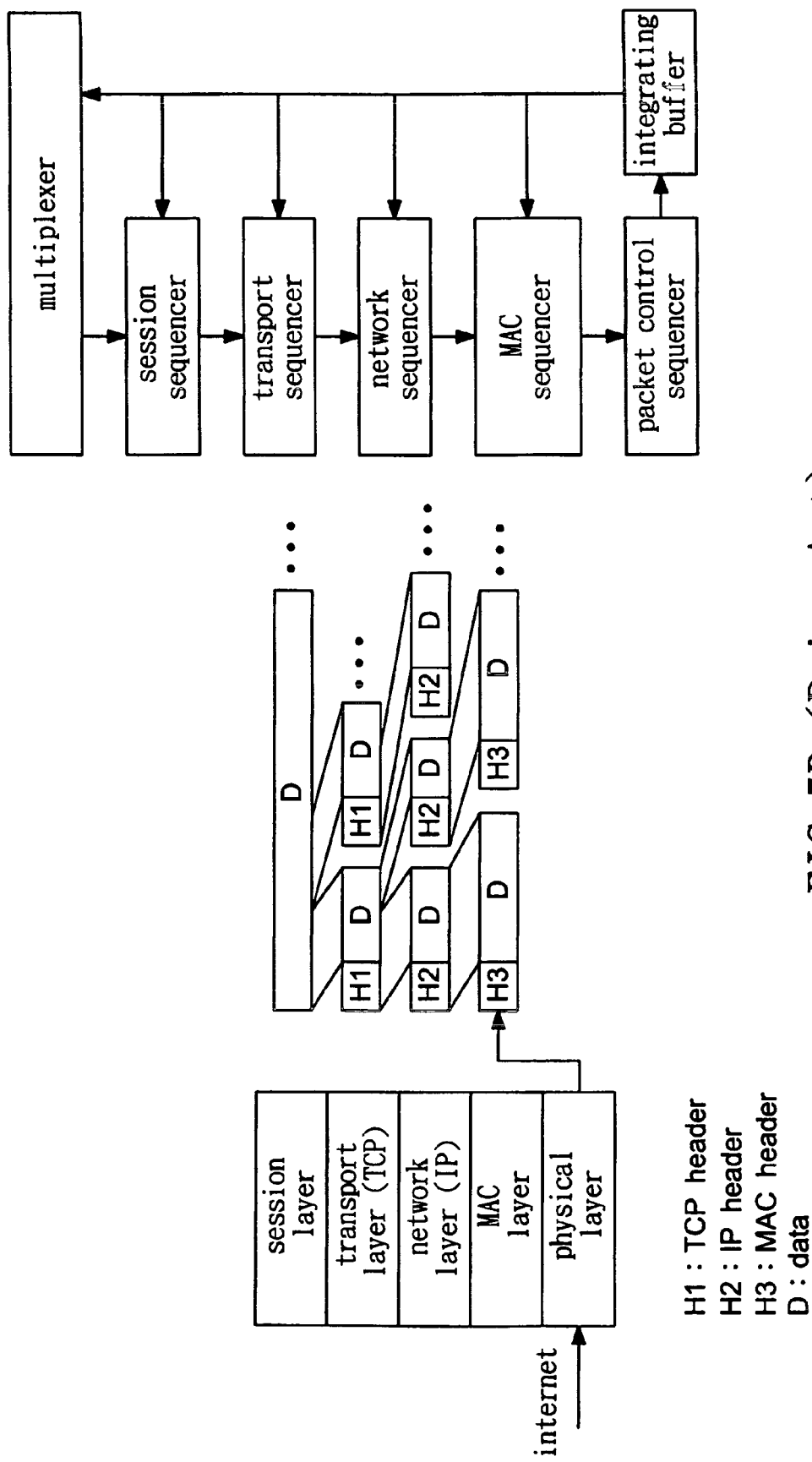
FIG. 5B shows the process for receiving packets of the prior art.

Referring to FIG. 4, it shows the message interface controller of the present invention. The message interface controller 50 comprises a message-in controller 51, a message-in RAM 52, a message-out controller 53 and a message-out RAM 54. Referring to FIG. 1 and FIG. 4, the message-in controller 51 is used to collect the receiving messages from the receiving device 60 and the control messages from the host interface device 30, and the message-in controller 51 queues the messages in the message-in RAM and provides an interface for the microprocessor 20 to read these messages.

The message-out RAM 54 is used to receive messages from the microprocessor 20. The message-out controller 53 is used to read the messages in the message-out RAM 54 and to transmit the messages to corresponding device according to the message type. For example, when the message type of each transmitting message is "transmitting device", message-out controller 53 then transmits each transmitting message to the transmitting device 70. As another example, when the message type of each control message is "host interface device", message-out controller 53 then transmits each control message to the host interface device 30.

The control messages are classified into the control request messages and the control extend message. The control request Messages are used to ask the host interface device 30 to do certain task, for example, transferring a received packet in the receiving buffer 65 (FIG. 2) to the host 80, or, as another example, transferring a payload of a received packet from the receiving buffer 65 to the host 80. The control extend messages are used by the microprocessor 20 and the host 80 to exchange other information with each other and can be extended if necessary.

Since the microprocessor 20 takes care only the offloadable packets, for any packet which is recognized as un-offloadable by the receiving device 60, its corresponding receiving message are directly forwarded by the message interface controller 50 to the host interface device 30 as a control request message. Then this control request message asks the host interface device 30 to retrieve the packet from the receiving buffer 65 and transfer it to the host 80.

Figure 6:
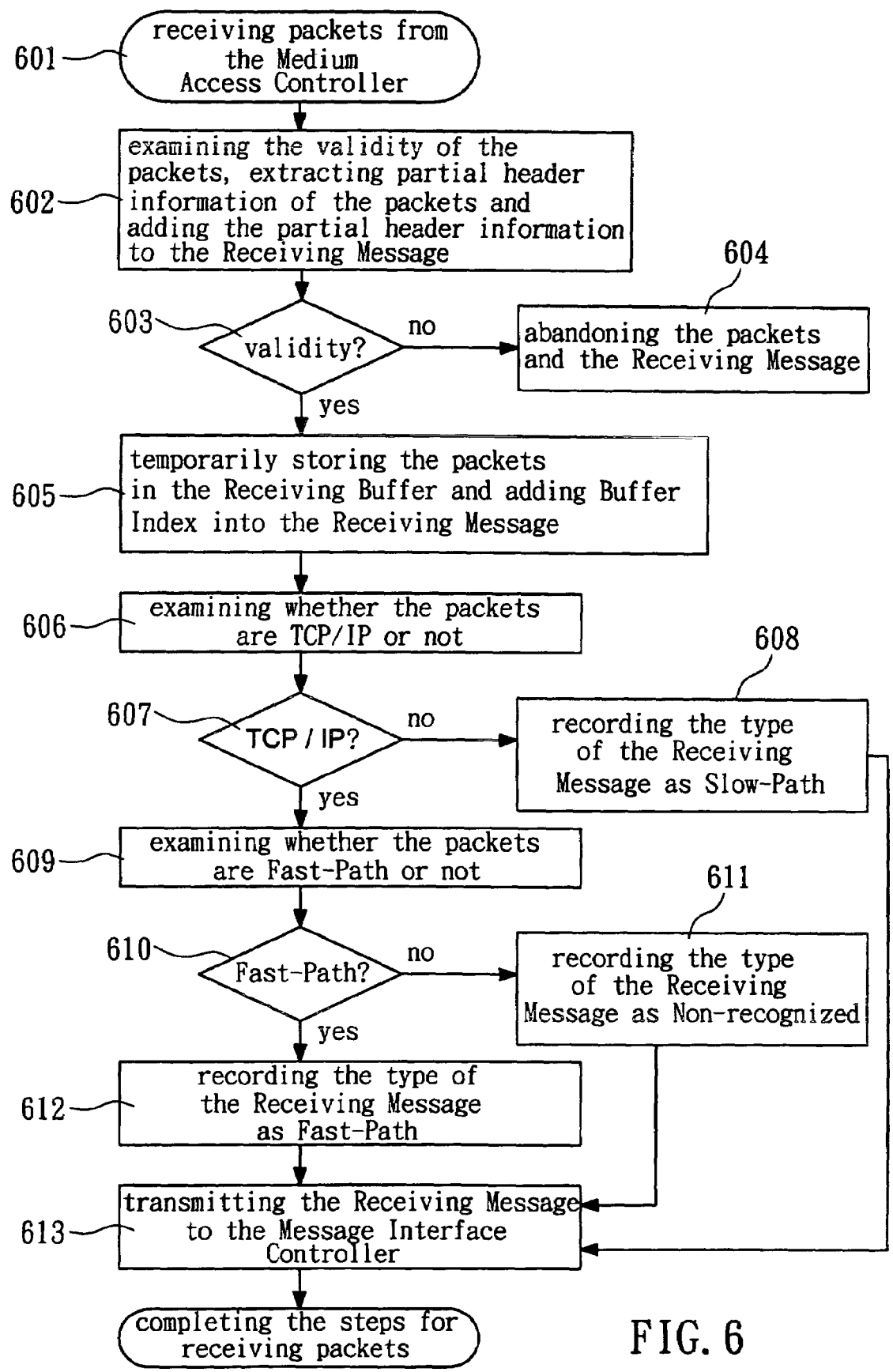
FIG. 6 shows a flowchart of processing steps of the receiving device according to the present invention.

Referring to FIG. 6 to FIG. 9, they show a flowchart of processing steps of the protocol processing system according to the present invention. Referring to FIGS. 1, 2 and 6, FIG. 6 shows a flowchart of the processing steps of the receiving device 60 in a TCP/IP embodiment. Referring to step 601, the receiving device 60 receives network packets from the medium access controller 40. Referring to step 602, the validity of the packets is examined, and partial header information of the packet is extracted and added to a receiving message. In the TCP/IP embodiment, IP header checksum and TCP packet checksum are examined for all received TCP/IP packets. Referring to step 603, according to the examined validity, one of the two branches are proceeded. For each invalid packet, the receiving device 60 abandons it and its corresponding receiving message, as shown in step 604. For each valid packet, the receiving device 60 generates a buffer index to stores the packets temporarily in the receiving buffer 65, and the receiving device 60 adds the buffer index into the receiving message, as shown in step 605.

Referring to step 606 and step 607, the packets are checked for recognizing whether the packets are TCP/IP packets or not. For each non-TCP/IP packet, the packet type of the correspond Receiving message is recorded as "slow-path" by the receiving device 60 as shown in step 608. Otherwise, for each TCP/IP packets, the receiving device 60 utilizes the content addressable memory 62 to recognize whether the packet to be offloaded as shown in step 609 and step 610. If the content addressable memory 62 has an identical socket pair as the TCP/IP packet, the packet type of the corresponding receiving message is recorded as "fast-path" by the receiving device 60, as shown in step 612. Otherwise, if the content addressable memory 62 has no identical socket pair as the TCP/IP packet, the packet type of the corresponding receiving message is recorded as "non-recognized" by the receiving device 60, as shown in step 611. Referring to step 613, after recognizing the packet type of the receiving message, the receiving device 60 transmits the receiving message to the message interface controller 50 so as to complete the step of receiving packets.

Figure 7A:
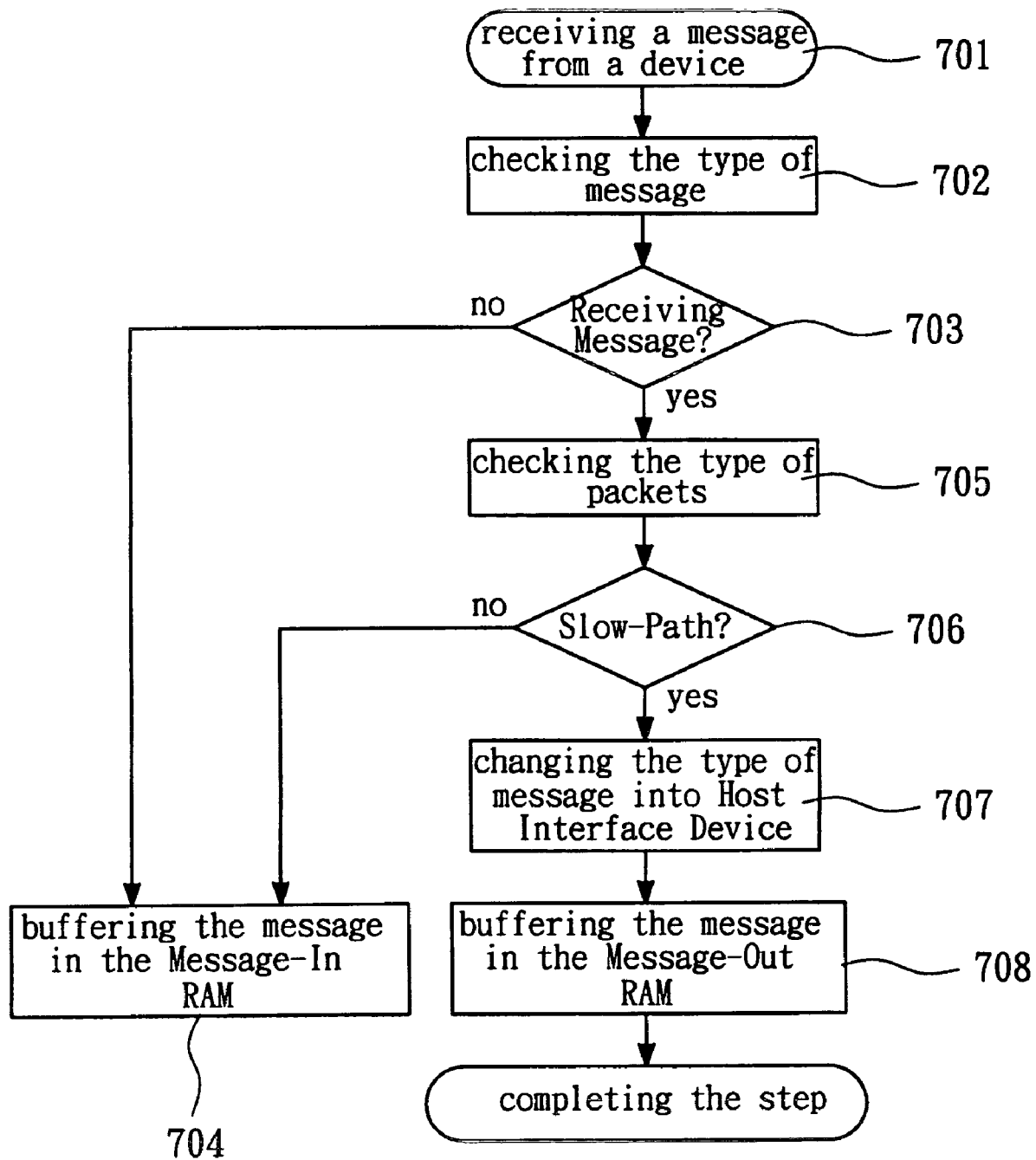
FIG. 7 shows a flowchart of processing steps of the message interface controller according to the present invention.

Referring to FIG. 7A, it shows the flowchart of processing steps of receiving message by the message interface controller 50. Referring to FIGS. 1, 4 and 7A, the FIG. 7A starts from receiving a message from a device, as shown in step 701. Firstly, the message type is checked to see whether the message is a receiving message, as shown in step 702 and step 703. If not a receiving message, the message is then buffered in the message-in RAM 52 for reading by the microprocessor 20, as shown in step 704. If it is a receiving message, the packet type of the message is then checked to see whether it is recorded as "slow-path", as shown in step 705 and step 706. If not recorded as "slow-path", the message is buffered in the message-in RAM 52 for reading by the microprocessor 20, as shown in step 704. Referring to step 707, if recorded as "slow-path", the message type of the receiving message is changed into "host interface device" and, referring to step 708, the message is then buffered in the message-out RAM 54 so that the message will then be directly transmitted to the host interface device 30 so as to complete the step.

Figure 7B:
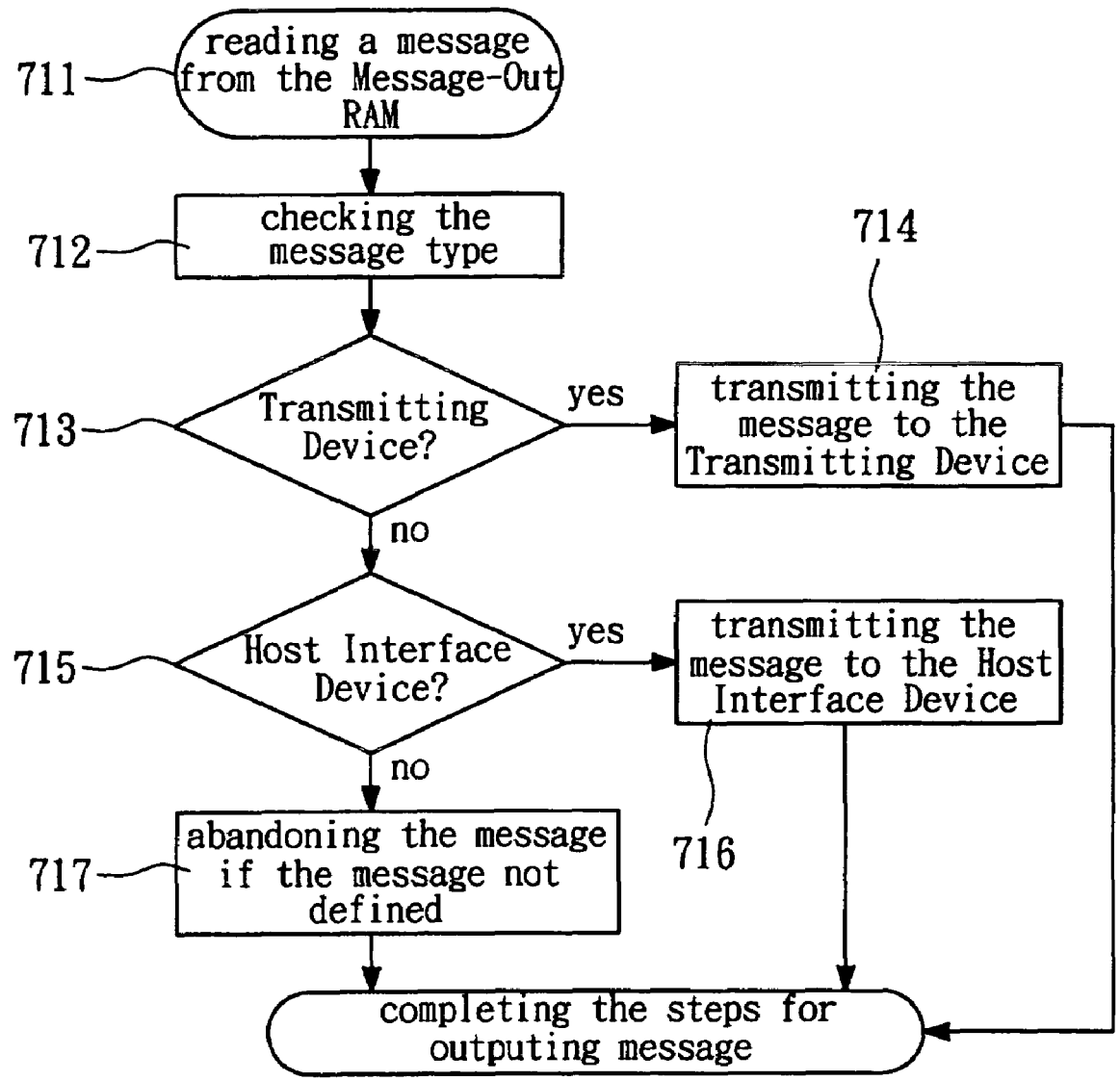

Referring to FIG. 7B, it shows the flowchart of processing steps of transmitting message by the message interface controller 50. Referring to FIGS. 1, 4 and 7B, a message is read from the message-out RAM 54 by the message interface controller 50, as shown in step 711. Referring to step 712, the message type of the message is checked to see where the message is going to be forwarded. Firstly, if the message type is "transmitting device", the message is then transmitted to the transmitting device 70, as shown in step 713 and step 714, so as to complete the processing steps. Otherwise, if the message type is "host interface device", the message is then transmitted to the host interface device 30, as shown in step 715 and step 716, so as to complete the processing steps. If the message type is neither "transmitting device" nor "host interface device", the message is not defined and is abandoned so as to complete the processing steps, as shown in step 717.

Figure 8:
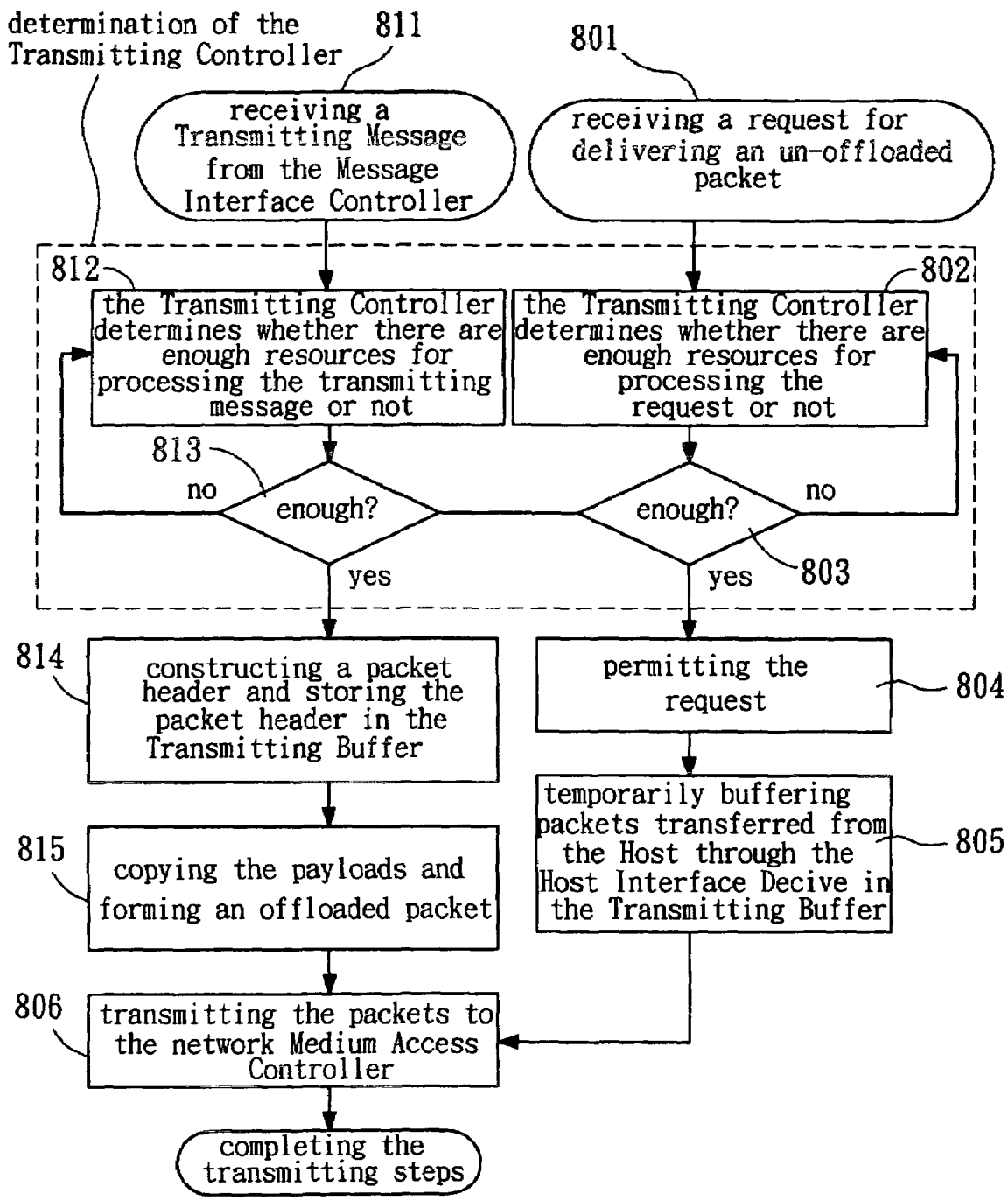
FIG. 8 shows a flowchart of processing steps of a transmitting device according to the present invention.

Referring to FIG. 8, it shows the flowchart of processing steps of the transmitting device 70 in a TCP/IP embodiment. Referring to FIGS. 1, 3 and 8, there are two initiation methods for the processing steps. The first is that the transmitting device 70 receives a request from the host interface device 30 which want to deliver an un-offloaded packet from the host 80, as shown in step 801. The transmitting controller 72 determines whether there is enough resource for processing the requests, as shown in step 802 and step 803. The transmitting controller 72 does not grant the requests until there is enough resource for processing the request, as shown in step 804. If resource is enough, the transmitting controller 72 grants the request, and then, the packet is transferred the host 80 through the host interface device 30 and temporarily buffered in the transmitting buffer 71, as shown in step 805. Finally, the packet are transmitted without any modification to the medium access controller 40 by the transmitting controller 72 so as to complete the transmitting step, as shown in step 806.

The second initiation method is that the transmitting device 70 receives a transmitting message from the message interface controller 50, as shown in step 811. The transmitting controller 72 determines whether there is enough resources for processing the transmitting message and, if there is not enough resource, suspends the processing of the transmitting message until resource is enough, as shown in step 812 and step 813. When there is enough resources, the transmitting controller 72 constructs a packet header from the partial header information given by the transmitting message and stores the constructed packet header in the transmitting buffer 71, as shown in step 814. According to the payload address of host 80 and the payload length given by the transmitting message, a payload is copied to the transmitting buffer 71 from the host 80 through the host interface controller 30. The copied payload is combined with the constructed packet header in the transmitting buffer 71 to form an offloaded packet, as shown in step 815. Note that, the IP header checksum and the TCP packet checksum of the offloaded packet are calculated and inserted into the IP header and TCP header respectively during the header constructing and the payload transferring. After all, the offloaded packet is then transmitted to the medium access controller 40 so as to complete the processing steps, as shown in step 806.

Referring to FIGS. 9A to 9E, they show the flowchart of processing steps of the host interface device 30. Firstly, Referring to FIGS. 1, 2 and 9A, the host interface device 30 receives a message from the message interface controller 50, and the message sub-type shows it belongs to the class of control request message, as shown in step 911. The host interface device 30 determines whether there is enough resources for processing the control request message, and, if there is not enough resource, suspends the processing of the control request message until resource is enough, as shown in step 912 and step 913. When there is enough resource for processing the control request message, the message sub-type of the control request message is future distinguished to see whether the request is for an offloadable packet or a un-offloadable packet, as shown in step 914. If it is for an offloadable packet, the control request message at least comprises fields including a buffer index, an offset, a transfer size, and a destination host address. Using these fields, a payload is retrieved from the receiving buffer and transferred to the host 80, so as to complete the processing steps of the host interface device 30, as shown in step 915. If it is for an un-offloadable packet, the control request message at least comprises fields including a buffer index and a transfer size. Using these fields, a packet is retrieved from the receiving buffer and transferred to the host 80, so as to complete the processing steps of the host interface device 30, as shown in step 916.

Figure 9A:
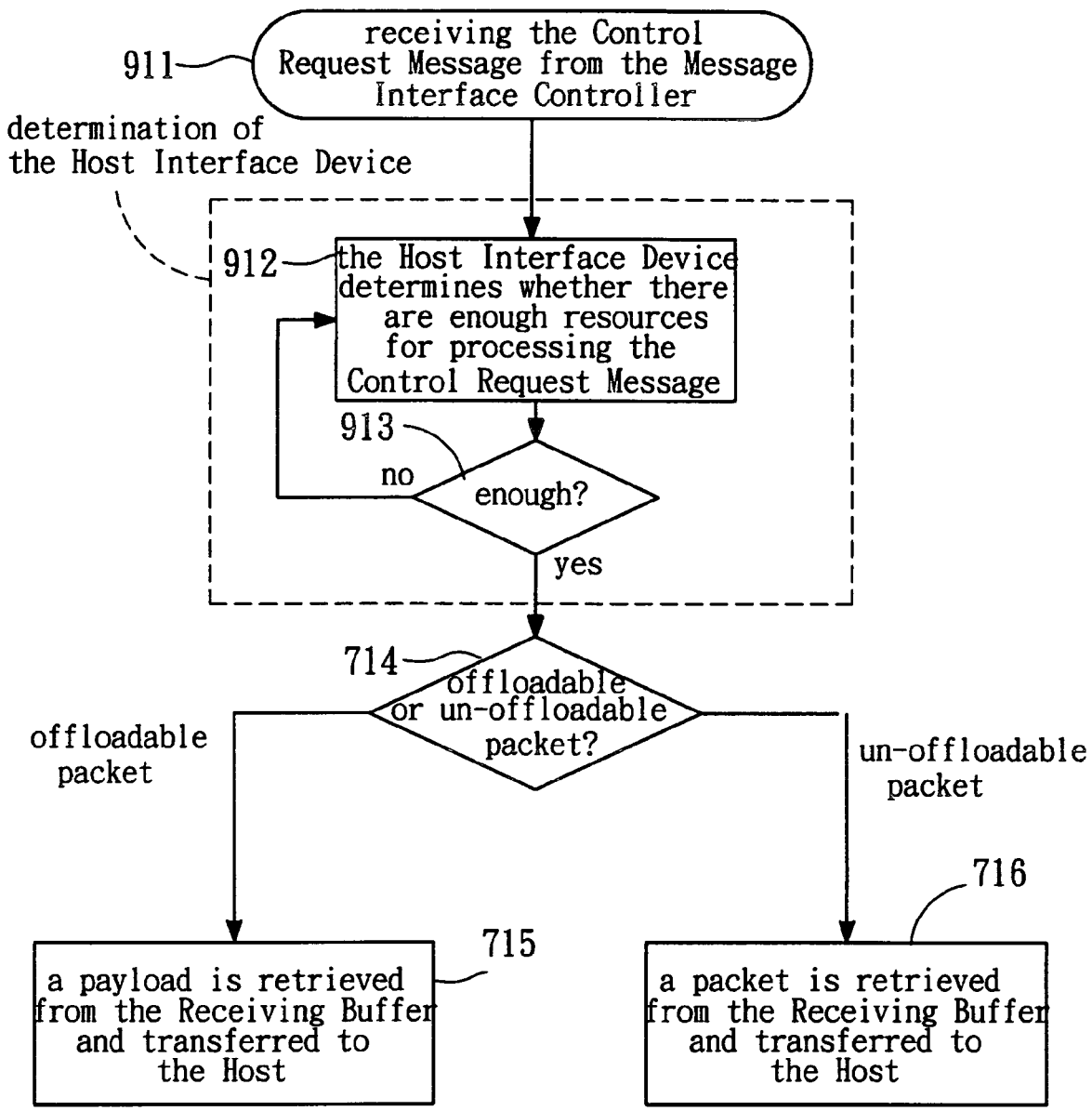
FIGS. 9A to 9E show a flowchart of processing steps of a host interface according to the present invention.
Figure 9B:
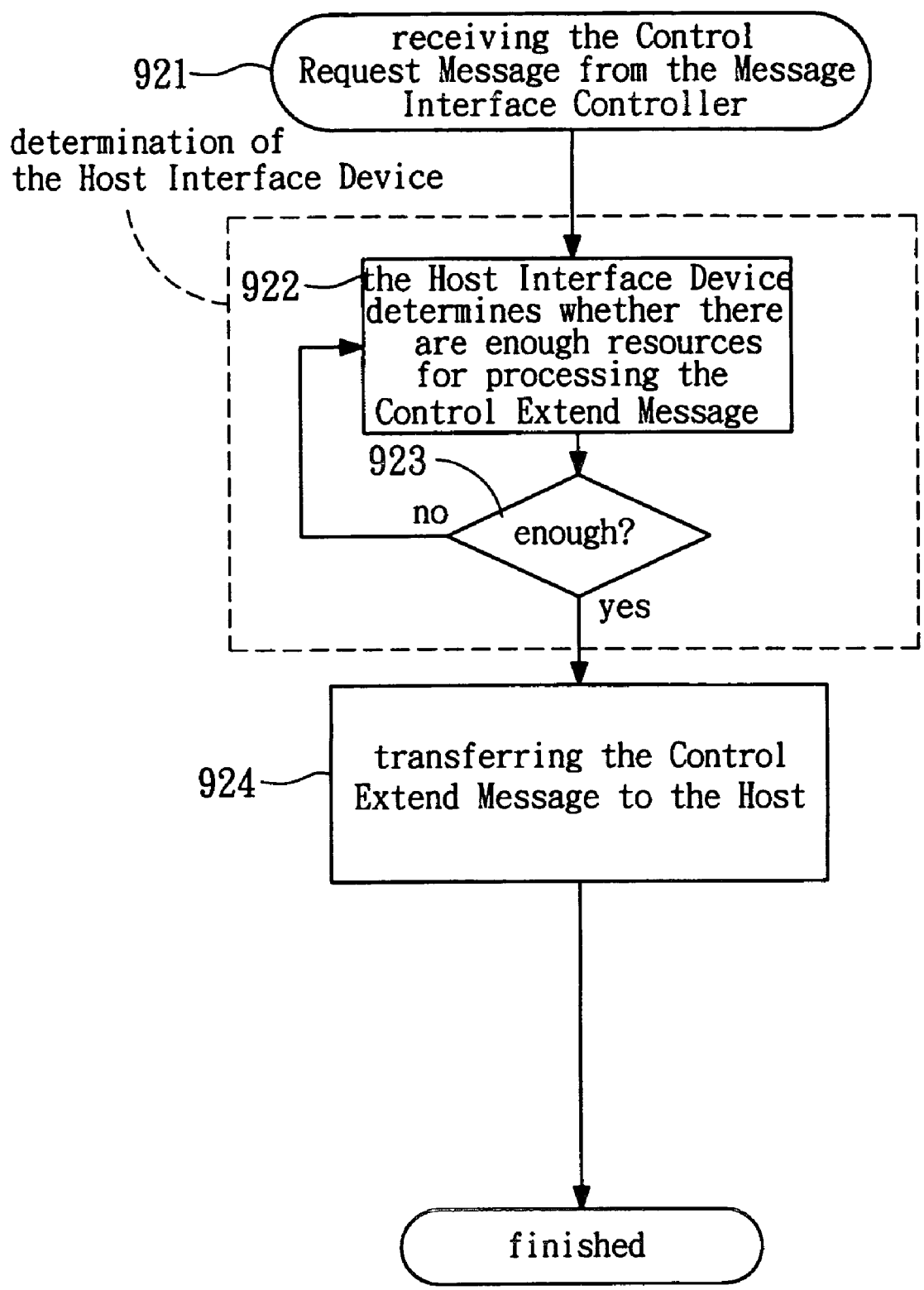

Referring to FIGS. 1 and 9B, referring to step 921, if the message subtype does not belong to the class of control request message, it belongs to the class of control extend message. Then, the host interface device 30 determines whether there is enough resources for processing the control extend message, and, if there is not enough resource, suspends the processing of the control extend message until resource is enough, as shown in step 922 and step 923. When there is enough resources for processing the control extend Message, the message is transferred to the host 80 without any modifying, so as to complete the processing steps of the host interface device 30, as shown in step 924.

Figure 9C:
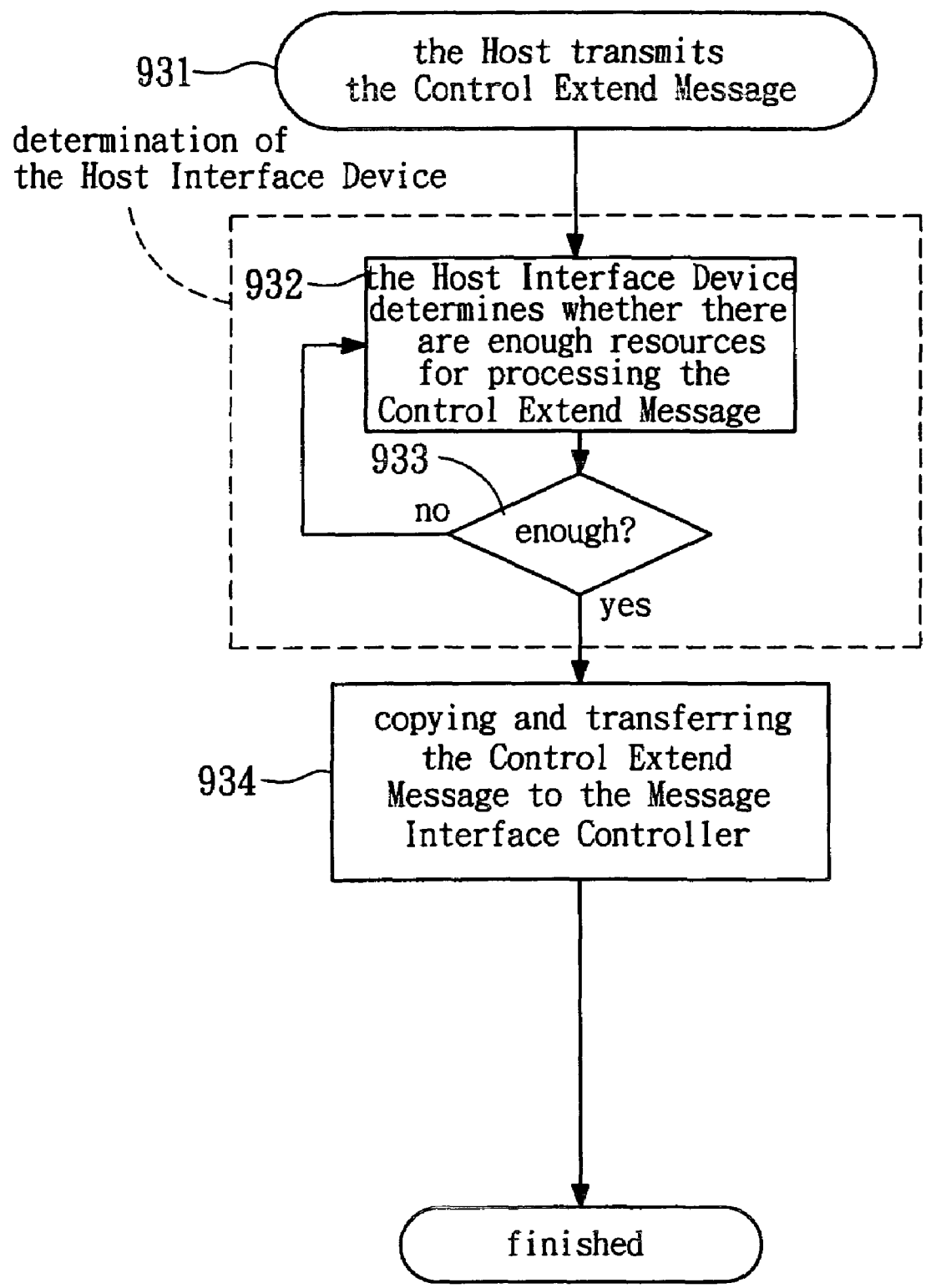

Referring to FIGS. 1 and 9C, referring to step 931, the host interface device 30 also at least accepts two kinds of request from the host 80. The first one is message notifications. In this case, if the host 80 wants to issue a control extend message to the microprocessor 20, the host 80 notifies the host interface device 30 that a control extend message is ready in host 80 side. After being notified, the host interface device 30 determines whether there is enough resources for processing the control extend message, and, if there is not enough resource, suspends the processing of the control extend message until resource is enough, as shown in step 932 and step 933. When there is enough resources for processing the control extend message, the message is copied and transferred to the message interface controller 50 so as to complete the processing steps of the host interface device 30, as shown in step 934.

Figure 9D:
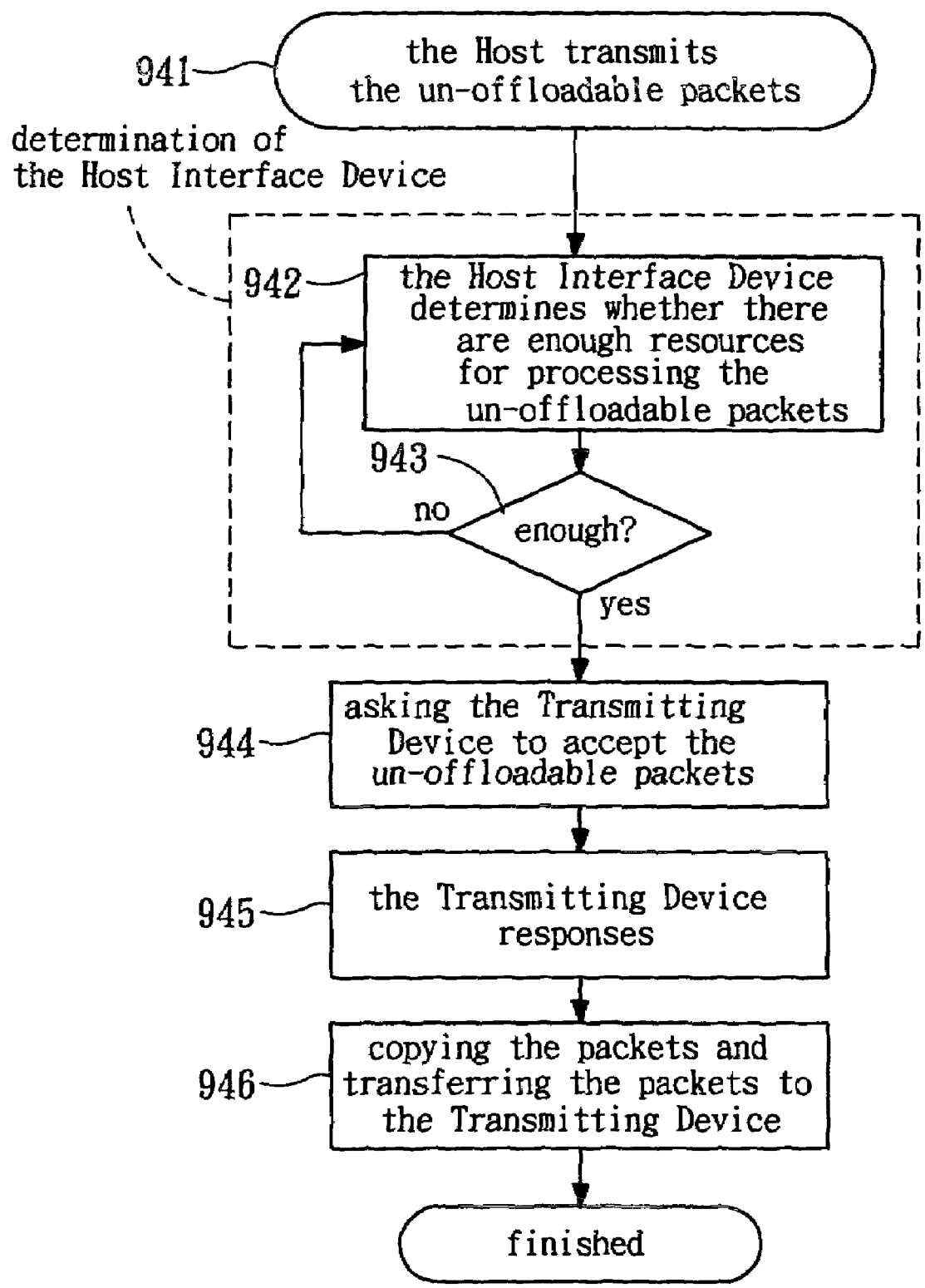

Referring to FIGS. 1 and 9D, referring to step 941, the second kind of request is that host 80 wants to send an un-offloadable packet to the network. In this case, if the host 80 wants to start sending an un-offloadable packet, the host 80 notifies the host interface device 30 that an un-offloadable packet is ready in host 80 side. After being notified, the host interface device 30 determines whether there is enough resources for processing the request, and, if there is not enough resource, suspends the processing of the request until resource is enough, as shown in step 942 and step 943. When there is enough resources for processing the request, the host interface device 30 asks the transmitting device 70 that whether it is ready to accept an un-offloadable packet, as shown in step 944. After the transmitting device 70 responses that it is ready, as shown in step 945, the packet is copied and transferred to the transmitting device 70 so as to complete the processing steps of the host interface device 30, as shown in step 946.

Figure 9E:
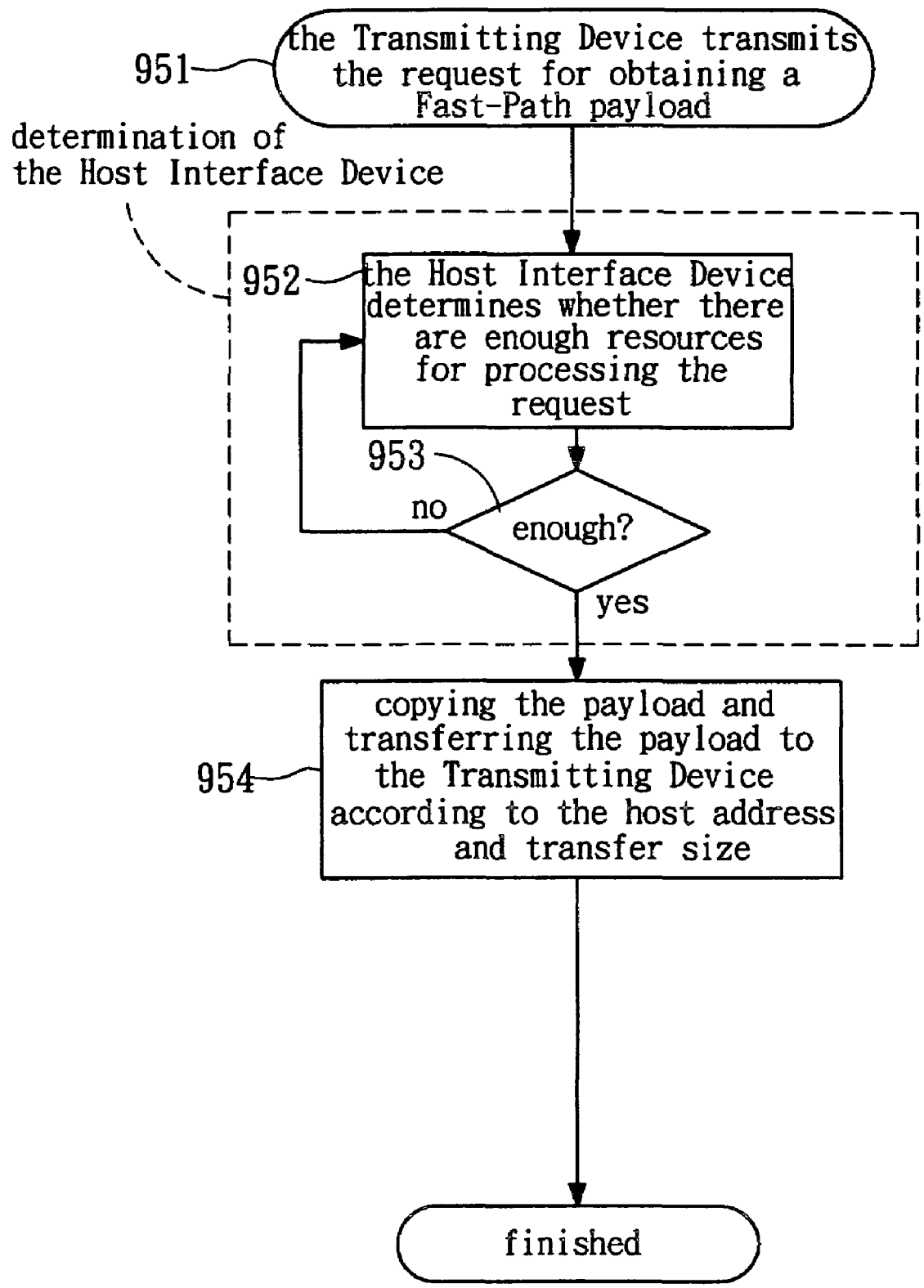

Referring to FIGS. 1 and 9E, in step 951, the host interface device 30 also accepts one kind of request from the transmitting device 70, which wants to get the payload of an offloadable packet from the host 80. When the transmitting device 70 requests the host interface device 30 with a host address and a transfer size to transfer the payload, the host interface device 30 determines whether there is enough resources for processing the transfer, and, if there is not enough resource, suspends the processing of the transfer until resource is enough, as shown in step 952 and step 953. When there is enough resources for processing the transfer the payload is copied and transferred to the transmitting device 70 by the host interface device 30 according to the host address and the transfer size so as to complete the working steps of the host interface 30, as shown in step 954.

By utilizing the system 10 of the invention, the offloadable packets are processed directly by the microprocessor 20, and only the payloads are exchanged with the host 80. Hence the designate network loading, for example TCP/IP, of the host 80 is released and the efficiency of the host 80 can be improved.

This invention comprises a messaging mechanism between a Protocol Processing Engine and its attached host. Exemplary packet and message flows inside the Protocol Processing Engine are revealed based on such a messaging mechanism, Since the messaging mechanism accompanied with the enclosed architecture is general enough, the tasks of the microprocessor 20 can be easily extended to support other popular protocols in addition to TCP/IP. The system 10 of the invention utilizes the message mechanism to provide communications between the microprocessor 20 and all the devices.

Above all, the extensible protocol processing system 10 of the invention utilizes an extensible messaging mechanism. This messaging mechanism allows the microprocessor 20 and the host 80 to simply extend new control extend messages and modify the related firmware/software to increase the ability of the extensible protocol processing system 10. Besides, by utilizing this messaging mechanism, new devices can be added with little impact to other device, and hence reduce the debugging efforts in future hardware extension. By this way, the function of the extensible protocol processing system 10 of the invention can be easily extended. Therefore, the integrated circuit chip including the extensible protocol processing system 10 of the invention can be utilized to various applications by just reloading different version of firmware/software and drivers, hence makes the chip extensible.

While the embodiments have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications that maintain the spirit and scope of the present invention are within the scope as defined in the appended claims.

What is claimed is:

1. An extensible protocol processing system, mounted between a host and a network, utilized to offload the packet processing of designate network protocols from the host, and the protocol processing system comprising:

a microprocessor, for offloading the packet processing of designate network protocols from the host;

a medium access controller, for connecting to the network;

a host interface device, for connecting to the host to exchange the packets, payloads and control messages;

a message interface controller, for receiving messages and providing an interface for the microprocessor to access the received message, and for receiving messages from the microprocessor, and forwarding each the message to an assigned device;

a receiving device, for temporarily storing the packets received by the medium access controller and examining the validity of the packets, and extracting at least part of header information from each received packet to form a receiving message and transmitting the message to the message interface controller; and a transmitting device, for transmitting one of two kinds of the packets to the network medium access controller, a first kind of packet transmitted directly from the host to the transmitting device via the host interface device, a second kind of packet combined by header information and a corresponding payload, the header information comprising a transmitting message.

2. The protocol processing system according to claim 1, wherein the receiving device classifies the examined valid packets into three types according a recognizing step, the types of the packets are added to the receiving message of the packets, and the types of the packets comprise: fast-path, slow-path and non-recognized, wherein the fast-path indicates that the microprocessor is responsible to process the receiving packets, the slow-path indicates that the host is responsible to process the received packets, the non-recognized indicates that the receiving device cannot recognize the packets and the recognizing step is postponed and performed by the microprocessor.

3. The protocol processing system according to claim 2, wherein the receiving device comprises a receiving controller for deciding the temporary store address, examining the validity of the packets, recognizing the type of the packets, and generating and transmitting the receiving message.

4. The protocol processing system according to claim 3, wherein the receiving device further comprises a content addressable memory for storing a plurality of recognizing information of the fast-path.

5. The protocol processing system according to claim 4, wherein the receiving device further comprises a scorekeeper for calculating a usage status of the recognizing information stored in the content addressable memory.

6. The protocol processing system according to claim 5, wherein the receiving device further comprises a recognizing interface controller for providing an interface for the microprocessor to set the recognizing information of the content addressable memory and to read the usage status of the scorekeeper.

7. The protocol processing system according to claim 3, wherein the receiving device further comprises a receiving buffer for storing the valid packets examined by the receiving controller, and the valid packets or valid payloads are transmitted to the host through the host interface device.

8. The protocol processing system according to claim 1, wherein the transmitting device comprises a transmitting buffer for temporarily storing the packets that are going to be transmitted.

9. The protocol processing system according to claim 8, wherein the transmitting message at least comprises the header information of the packet, the payload address of the host terminal and the payload length.

10. The protocol processing system according to claim 8, wherein the transmitting device further comprises a transmitting controller, the transmitting controller is used for receiving the transmitting message, and for constructing a packet header from the transmitting message and stores the packet header in the transmitting buffer, according to the payload address of host and the payload length, a payload is copied into the transmitting buffer from the host through the host interface controller, the copied payload is combined with the constructed packet header in the transmitting buffer to form an offloaded packet, and the offloaded packet is then transmitted to the medium access controller.

11. The protocol processing system according to claim 1, wherein the message interface controller comprises a message-in controller and a message-in RAM, the message-in controller is used to collect the receiving message from the receiving device and the control message from the host interface device, and the message-in controller is used to queue the messages in the message-in RAM and provides an interface for the microprocessor to read these messages.

12. The protocol processing system according to claim 1, wherein the message interface controller comprises a message-out controller and a message-out RAM, the message-out RAM is used to receive the messages from the microprocessor, and the message-in controller is used to read the messages in the message-out RAM and to transmit the messages to the transmitting device or the host interface device.

13. The protocol processing system according to claim 7, wherein the receiving message at least comprises: header information of the packet, packet type and buffer index for indicating where a received packet is temporarily stored in the receiving buffer.

14. The protocol processing system according to claim 7, wherein the control messages are classified into control request messages and control extend messages, the control request messages are used to ask the host interface device to transfer data from the receiving buffer to the host, and the control extend messages are used by the host and the microprocessor to exchange information with each other.

15. The protocol processing system according to claim 14, wherein the host interface device is used to transmit the packet or the payload of the receiving buffer to the host according to the control request message transmitted by the microprocessor.

16. The protocol processing system according to claim 15, wherein the receiving message are directly forwarded by the message interface controller to the host interface device as the control request message while the packet is recognized as the slow-path, and the control request message asks the host interface device to retrieve the packet from the receiving buffer and transfer it to the host.

* * * * *